United States Patent
Kuang et al.

(10) Patent No.: US 9,282,610 B2
(45) Date of Patent: Mar. 8, 2016

(54) DIMMING MODE DETECTION METHOD USED IN LED DRIVING APPARATUS

(71) Applicant: Chengdu Monolithic Power Systems Co., Ltd., Chengdu (CN)

(72) Inventors: Naixing Kuang, Hangzhou (CN); Jiali Cai, Hangzhou (CN); Lin Feng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/738,656

(22) Filed: Jun. 12, 2015

(65) Prior Publication Data

US 2015/0366019 A1 Dec. 17, 2015

(30) Foreign Application Priority Data

Jun. 13, 2014 (CN) .......................... 2014 1 0262033

(51) Int. Cl.
*H05B 37/02* (2006.01)
*H05B 33/08* (2006.01)

(52) U.S. Cl.
CPC ........ *H05B 33/0845* (2013.01); *H05B 33/0818* (2013.01)

(58) Field of Classification Search
USPC ..................................... 315/200 R–210, 307
See application file for complete search history.

(56) References Cited

U.S. PATENT DOCUMENTS

| | | | | |
|---|---|---|---|---|
| 8,536,799 B1 * | 9/2013 | Grisamore | ......... | H05B 33/0848 315/185 R |
| 2011/0285301 A1 | 11/2011 | Kuang et al. | | |
| 2013/0113391 A1 * | 5/2013 | Mercier | ............ | H05B 33/0809 315/291 |
| 2013/0154487 A1 | 6/2013 | Kuang et al. | | |

\* cited by examiner

*Primary Examiner* — Douglas W Owens
*Assistant Examiner* — Jonathan Cooper
(74) *Attorney, Agent, or Firm* — Perkins Coie LLP

(57) ABSTRACT

A dimming mode detection method is used in an LED driving apparatus including a rectifier bridge providing a DC bus voltage and a switching converter configured to convert the DC bus voltage into a driving signal to drive an LED. The method involves: powering on the LED driving apparatus; sensing the DC bus voltage and generating a voltage sensing signal; comparing a rising time during which the voltage sensing signal increases from a second threshold voltage to a first threshold voltage with a first time threshold to detect whether the LED driving apparatus is connected to a leading edge dimmer; and comparing a falling time during which the voltage sensing signal decreases from a third threshold voltage to a fourth threshold voltage with a second time threshold to detect whether the LED driving apparatus is connected to a trailing edge dimmer.

20 Claims, 10 Drawing Sheets

DIMMING MODE DETECTION METHOD USED IN LED DRIVING APPARATUS

CROSS-REFERENCE TO RELATED APPLICATIONS

This application claims the benefit of CN application 201410262033.3 filed on Jun. 13, 2014, and incorporated herein by reference.

TECHNICAL FIELD

The present invention generally relates to electronic circuits, and more particularly but not exclusively to LED driving apparatuses and dimming mode detection methods thereof.

BACKGROUND

Nowadays, there is an increasing interest to replace conventional incandescent bulbs with LEDs (light emitting diodes). Nevertheless, how to make LED driving apparatus be compatible with dimmers in existing lighting apparatuses becomes a challenge.

The most common type of dimmers is phase cut dimmer including leading edge dimmer and trailing edge dimmer, wherein the main supply is cut off for part of the main cycle. In some situations, the dimmer has been removed so there is no dimmer. To sum up, there are three different dimming conditions: leading edge dimming, trailing edge dimming and no dimming. The working principles of these three dimming conditions are so different that the LED driving apparatus needs to distinguish the dimming conditions and work in different operation modes accordingly. Otherwise, its performance will suffer and a flicker may happen.

The existing solutions of dimming mode detection are few and generally based on digital technology, which is complicated and high cost. Therefore, there is an ongoing need to find an effective and easy way to detect the dimming mode.

SUMMARY

Embodiments of the present invention are directed to a dimming mode detection method used in an LED driving apparatus. The LED driving apparatus includes a rectifier bridge providing a DC bus voltage, a bus capacitor coupled between output terminals of the rectifier bridge, a bleeding circuit configured to provide a bleeding current for the bus capacitor and a switching converter configured to convert the DC bus voltage into a driving signal to drive an LED. The dimming mode detection method comprises: powering on the LED driving apparatus; sensing the DC bus voltage and generating a voltage sensing signal; comparing a rising time during which the voltage sensing signal increases from a second threshold voltage to a first threshold voltage with a first time threshold to detect whether the LED driving apparatus is connected to a leading edge dimmer, and entering into a leading edge dimming mode if the LED driving apparatus is detected to be connected to a leading edge dimmer; comparing a falling time during which the voltage sensing signal decreases from a third threshold voltage to a fourth threshold voltage with a second time threshold to detect whether the LED driving apparatus is connected to a trailing edge dimmer, and entering into a trailing edge dimming mode if the LED driving apparatus is detected to be connected to a trailing edge dimmer; and entering into a no dimming mode if the LED driving apparatus does not enter the leading edge dimming mode or the trailing edge dimming mode in a predetermined time from the LED driving apparatus being powered on.

Embodiments of the present invention are also directed to a controller used in an LED driving apparatus. The controller comprises: a dimming mode detector configured to receive a voltage sensing signal indicative of the DC bus voltage, wherein the dimming mode detector compares a rising time during which the voltage sensing signal increases from a second threshold voltage to a first threshold voltage with a first time threshold to detect whether the LED driving apparatus is connected to a leading edge dimmer, and compares a falling time during which the voltage sensing signal decreases from a third threshold voltage to a fourth threshold voltage with a second time threshold to detect whether the LED driving apparatus is connected to a trailing edge dimmer, and wherein based on the comparison results, the dimming mode detector generates a leading edge dimming mode signal, a trailing edge dimming mode signal and a no dimming mode signal to indicate operation modes of the LED driving apparatus; a bleeding control circuit configured to receive the voltage sensing signal, wherein based on the voltage sensing signal, the bleeding control circuit generates a bleeding control signal to control the bleeding circuit; and a switch control circuit coupled to the dimming mode detector, wherein based on the leading edge dimming mode signal, trailing edge dimming mode signal and no dimming mode signal, the switch control circuit generates a switch control signal to control the switching converter.

Embodiments of the present invention are further directed to an LED driving apparatus comprising: a rectifier bridge having an output terminal, wherein the rectifier bridge is configured to generate a DC bus voltage at the output terminal; a bus capacitor coupled between the output terminal of the rectifier bridge and a reference ground; a voltage sensing circuit coupled to the output terminal of the rectifier bridge, wherein the voltage sensing circuit generates a voltage sensing signal indicative of the DC bus voltage; a bleeding circuit configured to provide a bleeding current for the bus capacitor; a switching converter coupled to the output terminal of the rectifier bridge, wherein the switching converter is configured to convert the DC bus voltage into a driving signal to drive an LED; a dimming mode detector coupled to the voltage sensing circuit to receive the voltage sensing signal, wherein the dimming mode detector compares a rising time during which the voltage sensing signal increases from a second threshold voltage to a first threshold voltage with a first time threshold to detect whether the LED driving apparatus is connected to a leading edge dimmer, and compares a falling time during which the voltage sensing signal decreases from a third threshold voltage to a fourth threshold voltage with a second time threshold to detect whether the LED driving apparatus is connected to a trailing edge dimmer, and wherein based on the comparison results, the dimming mode detector generates a leading edge dimming mode signal, a trailing edge dimming mode signal and a no dimming mode signal to indicate operation modes of the LED driving apparatus; a bleeding control circuit coupled to the voltage sensing circuit to receive the voltage sensing signal, wherein based on the voltage sensing signal, the bleeding control circuit generates a bleeding control signal to control the bleeding circuit; and a switch control circuit coupled to the dimming mode detector, wherein based on the leading edge dimming mode signal, trailing edge dimming mode signal and no dimming mode signal, the switch control circuit generates a switch control signal to control the switching converter.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
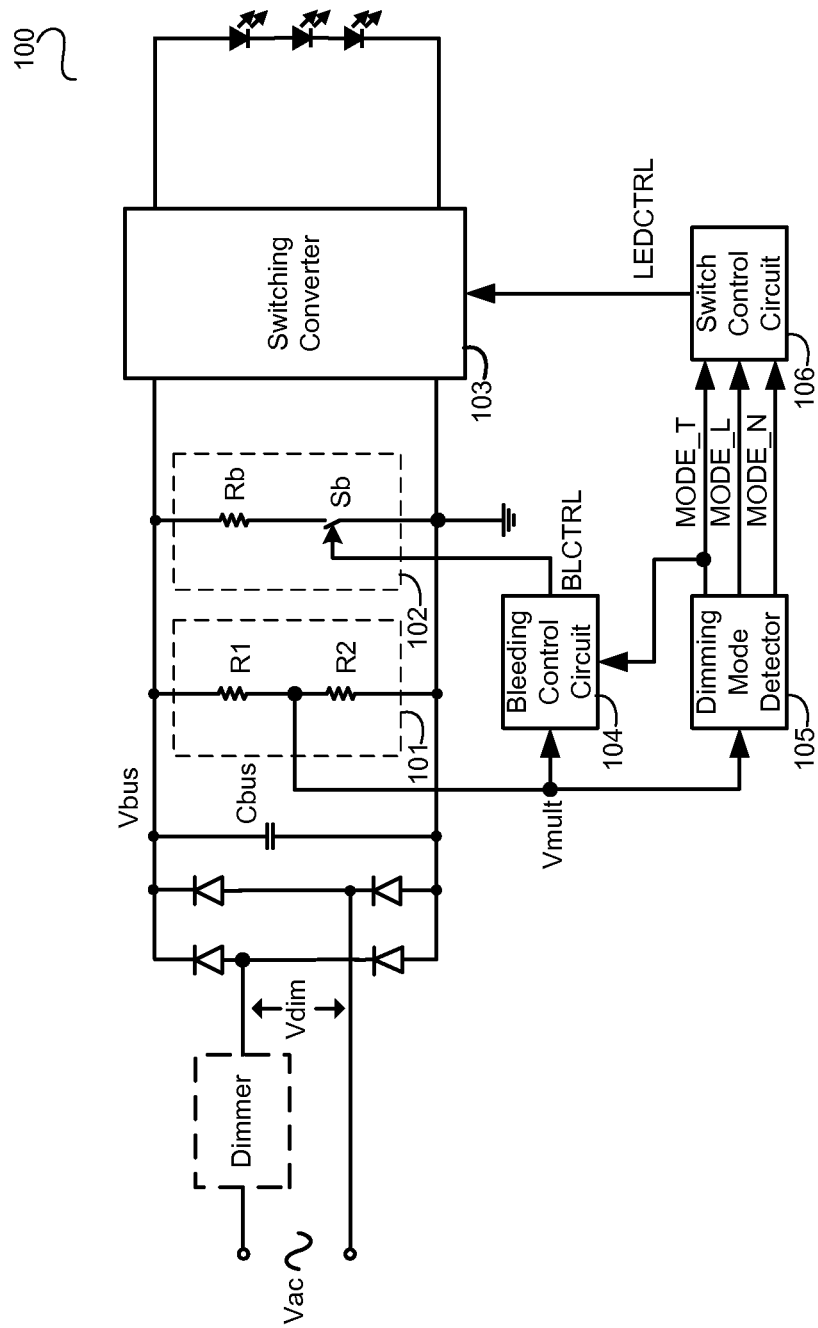
FIG. 1 schematically illustrates a block diagram of an LED driving apparatus 100 in accordance with an embodiment of the present invention.

FIG. 1 schematically illustrates a block diagram of an LED driving apparatus 100 in accordance with an embodiment of the present invention. The LED driving apparatus 100 comprises a rectifier bridge, a bus capacitor Cbus, a voltage sensing circuit 101, a bleeding circuit 102, a switching converter 103, a bleeding control circuit 104, a dimming mode detector 105 and a switch control circuit 106. The rectifier bridge is configured to rectify a voltage Vdim and generate a DC bus voltage Vbus at its output terminal. The bus capacitor Vbus is coupled between the output terminal of the rectifier bridge and a reference ground. In some embodiments, the voltage Vdim is output by a phase cut dimmer wherein an AC input voltage Vac is cut off for part of the main cycle. In some other embodiments, the phase cut dimmer is removed and the voltage Vdim is equal to the AC input voltage Vac.

The voltage sensing circuit 101 is coupled to the output terminal of the rectifier bridge. It senses the DC bus voltage Vbus and generates a voltage sensing signal Vmult indicative of the DC bus voltage. In the embodiment shown in FIG. 1, the voltage sensing circuit 101 consists of a resistor divider including resistors R1 and R2. The bleeding circuit 102 is coupled to the bus capacitor Cbus, and is configured to provide a bleeding current for the bus capacitor Cbus to make sure a trailing edge dimmer can work normally when connected to the LED driving apparatus. The switching converter 103 is coupled to the output terminal of the rectifier bridge, and is configured to convert the DC bus voltage Vbus into a driving signal to drive LEDs. Although there are only three LEDs shown in FIG. 1, people of ordinary skill can recognize that the LED driving apparatus 100 may be used to drive an LED string constituted of one or more LEDs, or a plurality of LED strings connected in parallel.

The bleeding control circuit 104 is coupled to the voltage sensing circuit 101 to receive the voltage sensing signal Vmult, wherein based on the voltage sensing signal Vmult, the bleeding control circuit 104 generates a bleeding control signal BLCTRL to control the bleeding circuit 102. In the embodiment of FIG. 1, the bleeding circuit 102 is connected to the bus capacitor Cbus in parallel and includes a bleeding resistor Rb and a bleeding transistor Sb. The bleeding control signal BLCTRL is provided to the control terminal of the bleeding transistor Sb.

The dimming mode detector 105 is coupled to the voltage sensing circuit 101 to receive the voltage sensing signal Vmult. Based on the voltage sensing signal Vmult, the dimming mode detector 105 detects whether the LED driving apparatus is connected to a leading edge dimmer or a trailing edge dimmer, or even not connected to any dimmer, and generates a leading edge dimming mode signal MODE_L, a trailing edge dimming mode signal MODE_T and a no dimming mode signal MODE_N to indicate operation modes of the LED driving apparatus. The dimming mode detector 105 compares a rising time tr during which the voltage sensing signal Vmult increases from a second threshold voltage Vth2 to a first threshold voltage Vth1 with a first time threshold TTH1 to detect whether the LED driving apparatus is connected to a leading edge dimmer. It further compares a falling time tf during which the voltage sensing signal Vmult decreases from a third threshold voltage Vth3 to a fourth threshold voltage Vth4 with a second time threshold TTH2 to detect whether the LED driving apparatus is connected to a trailing edge dimmer. If the LED driving apparatus is not detected to be connected to either a leading edge dimmer or a trailing edge dimmer in a predetermined time from the LED driving apparatus being powered on, the dimming mode detector 105 will conclude that the LED driving apparatus is not connected to any dimmer.

The switch control circuit 106 is coupled to the dimming mode detector 105, wherein based on the leading edge dimming mode signal MODE_L, trailing edge dimming mode signal MODE_T and no dimming mode signal MODE_N, the switch control circuit 106 generates a switch control signal LEDCTRL to control the switching converter 103.

In some embodiments, to reduce power loss, the bleeding control circuit 104 is further coupled to the dimming mode detector 105 to receive the trailing edge dimming mode signal MODE_T. And based on the trailing edge dimming mode signal MODE_T, the bleeding control circuit 104 enables the bleeding circuit 102 in the trailing edge dimming mode, and disables the bleeding circuit 102 in the leading edge dimming mode and no dimming mode. The bleeding circuit 102 may provide the bleeding current for the bus capacitor Vbus when the voltage sensing signal Vmult reduces to reach the third threshold voltage Vth3, and keeps doing that until the voltage sensing signal Vmult reaches the fourth threshold voltage Vth4.

The dimming mode detection method of the LED driving apparatus 100 will be further illustrated with reference to FIGS. 2A~4.

Figure 2A:
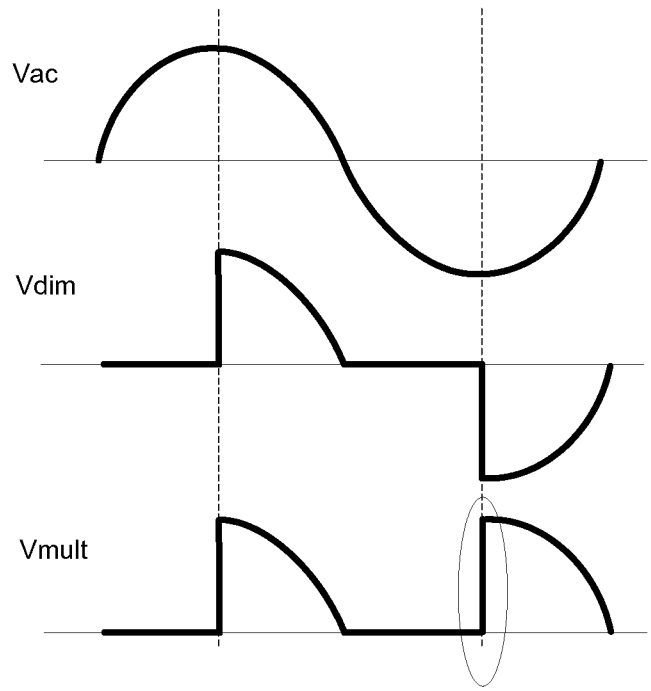
FIG. 2A schematically illustrates working waveforms of the LED driving apparatus 100 when it is connected to a leading edge dimmer.
Figure 2B:
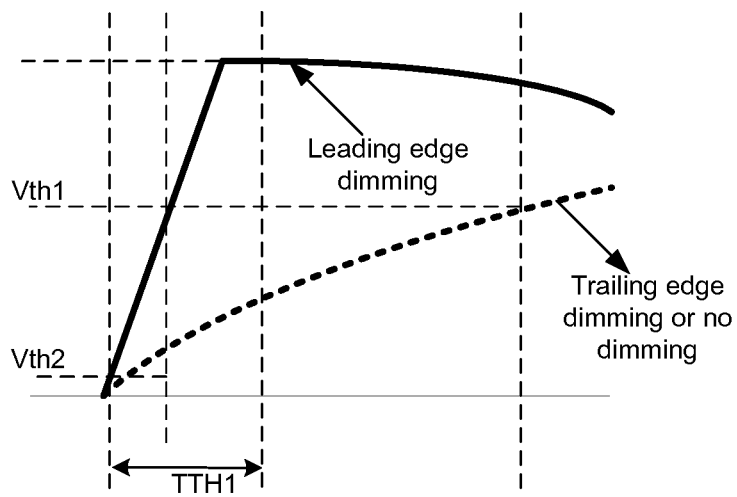
FIG. 2B illustrates a partial enlarged view of the voltage sensing signal Vmult shown in FIG. 2A.

FIG. 2A schematically illustrates working waveforms of the LED driving apparatus 100 when it is connected to a leading edge dimmer, and FIG. 2B is a partial enlarged view of the voltage sensing signal Vmult shown in FIG. 2A. As shown in FIG. 2B, the voltage sensing signal Vmult has a rising edge of which the phase varies with the dimming depth. Compared with trailing edge dimming mode and no dimming conditions, the rising rate of the voltage sensing signal Vmult under leading edge dimming is much faster. Hence, the dimming mode detector 105 calculates the rising time tr during which the voltage sensing signal Vmult rises from the second threshold voltage Vth2 to the first threshold voltage Vth1, and compares it with the first time threshold TTH1 to detect whether the LED driving apparatus 100 is connected to a leading edge dimmer. In one embodiment, the dimming mode detector 105 determines that the LED driving apparatus is connected to a leading edge dimmer if the rising time tr is shorter than the first time threshold Vth1, and therefore gets the LED driving apparatus to enter into the leading edge dimming mode.

Figure 3A:
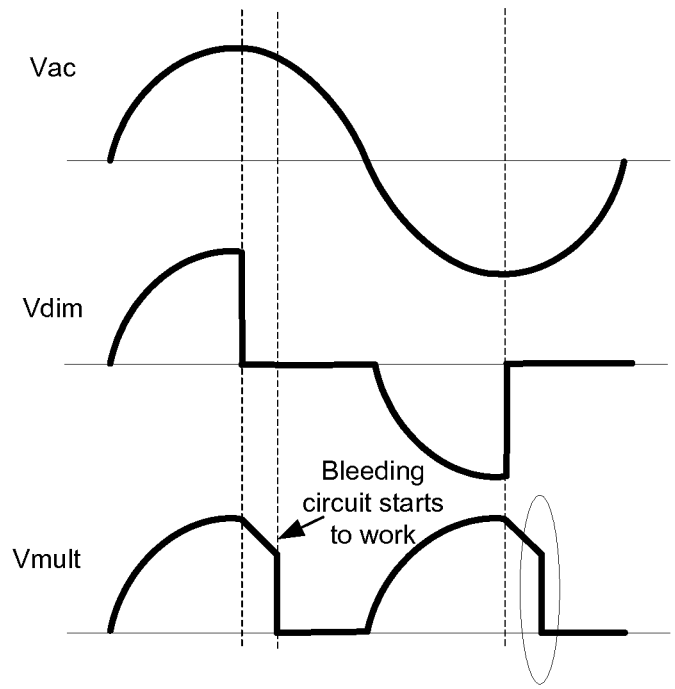
FIG. 3A schematically illustrates working waveforms of the LED driving apparatus 100 when it is connected to a trailing edge dimmer.
Figure 3B:
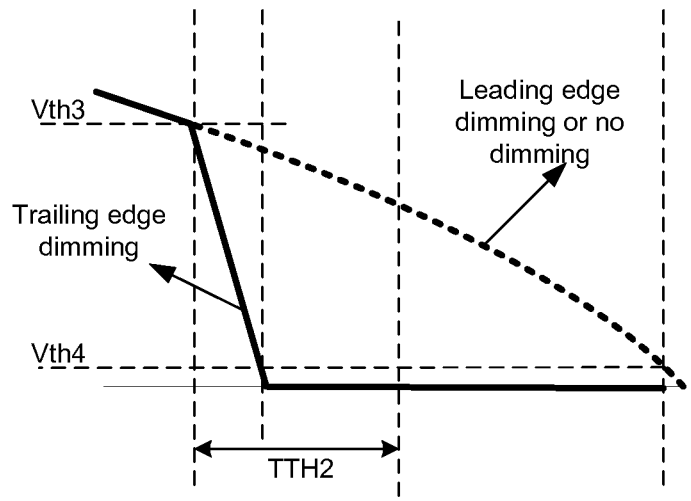
FIG. 3B illustrates a partial enlarged view of the voltage sensing signal Vmult shown in FIG. 3A.

FIG. 3A schematically illustrates working waveforms of the LED driving apparatus 100 when it is connected to a trailing edge dimmer, and FIG. 3B is a partial enlarged view of the voltage sensing signal Vmult shown in FIG. 3A. As shown in FIG. 3A, the trailing edge dimmer turns on at the zero cross of the AC input voltage Vac and turns off after a controllable delay. After the trailing edge dimmer being turned off, the voltage sensing signal Vmult as well as the DC bus voltage Vbus decreases gradually because of the bus capacitor Cbus. When the voltage sensing signal Vmult reduces to reach the third threshold voltage Vth3, the bleeding control circuit 104 turns on the bleeding transistor Sb to provide the bleeding current for the bus capacitor Cbus until the voltage sensing signal Vmult reaches the fourth threshold voltage Vth4. Due to the bleeding current, the voltage sensing signal Vmult under trailing edge dimming reduces rapidly. But for leading edge dimming and no dimming conditions, the falling rate of the voltage sensing signal Vmult is much slower even with the bleeding current. So the dimming mode detector 105 calculates the falling time tf during which the voltage sensing signal Vmult descends from the third threshold voltage Vth3 to the fourth threshold voltage Vth4, and compares it with the second time threshold TTH2 to detect whether the LED driving apparatus 100 is connected to a trailing edge dimmer. In one embodiment, the dimming mode detector 105 determines that the LED driving apparatus is connected to a leading edge dimmer if the falling time tf is shorter than the second time threshold Vth2, and therefore gets the LED driving apparatus to enter into the trailing edge dimming mode.

Figure 4:
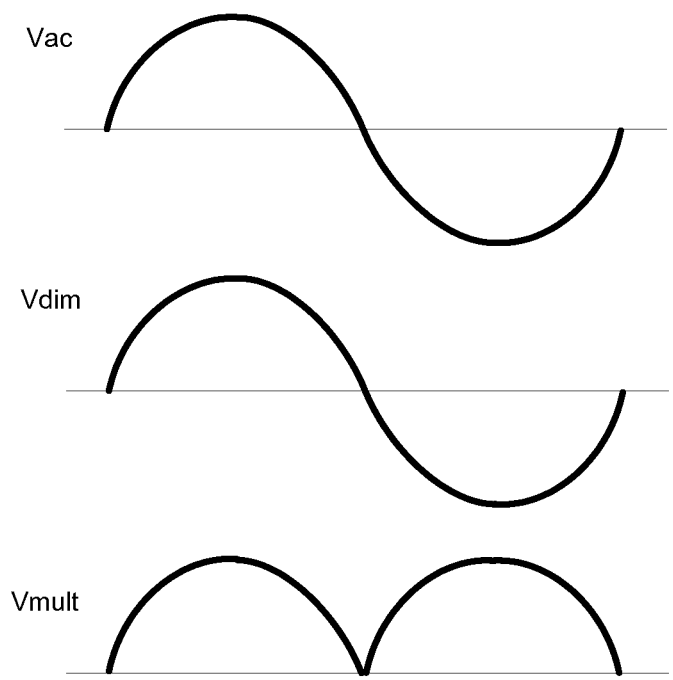
FIG. 4 schematically illustrates working waveforms of the LED driving apparatus 100 when it is not connected to any dimmer.

FIG. 4 schematically illustrates working waveforms of the LED driving apparatus 100 when it is not connected to any dimmer. As can be seen from FIG. 4, the voltage Vdim is equal to the AC input voltage Vac when the LED driving apparatus 100 is not connected to any dimmer. So the voltage sensing signal Vmult is a rectified sine wave and its rise and fall are both smooth and slow. As a result, if the dimming mode detector 105 does not detect that the LED driving apparatus is connected to a leading edge dimming mode or a trailing edge dimming mode in a predetermined time from the LED driving apparatus being powered on, it will determine that the LED driving apparatus is not connected to any dimmer and gets the LED apparatus 100 to enter into a no dimming mode.

Figure 5:
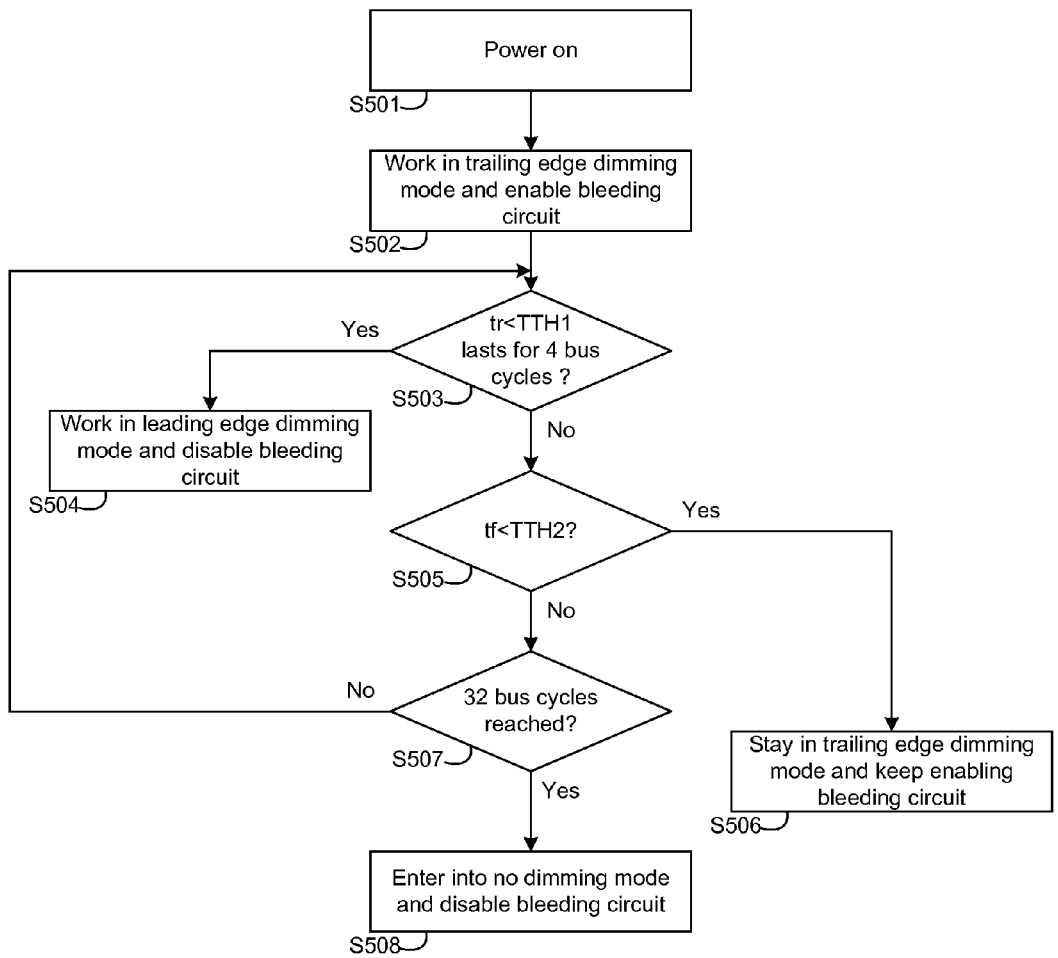
FIG. 5 illustrates a working flow chart of the LED driving apparatus 100 in accordance with an embodiment of the present invention.

FIG. 5 illustrates a working flow chart of the LED driving apparatus 100 in accordance with an embodiment of the present invention. It includes steps S501-S508.

At step S501, the LED driving apparatus is powered on.

At step S502, the LED driving apparatus enters into the trailing edge dimming mode and the bleeding circuit 102 is enabled.

At step S503, the rising time tr of the voltage sensing signal Vmult is compared with the first time threshold TTH1 to detect whether the LED driving apparatus is connected to a leading edge dimmer. If the LED driving apparatus is detected to be connected to a leading edge dimmer, the process will proceed to step S504, else it will proceed to step S505. In one embodiment, the LED driving apparatus will be deemed as being connected to a leading edge dimmer if the rising time tr is shorter than the first time threshold TTH1. In another embodiment, the LED driving apparatus will be deemed as being connected to a leading edge dimmer only if the rising time is shorter than the first time threshold in a plurality of successive bus cycles (e.g. four successive bus cycles). The bus cycle here is directed to the cycle of the DC bus voltage Vbus.

At step S504, the LED driving apparatus enters into the leading edge dimming mode and the bleeding circuit 102 is disabled.

At step S505, the falling time tf of the voltage sensing signal Vmult is compared with the second time threshold TTH2 to detect whether the LED driving apparatus is connected to a trailing edge dimmer. If the LED driving apparatus is detected to be connected to a trailing edge dimmer, the process will proceed to step S506, else it will proceed to step S507. In one embodiment, the LED driving apparatus will be deemed as being connected to a trailing edge dimmer if the falling time tr is shorter than the second time threshold TTH2.

At step S506, the LED driving apparatus maintains in the leading edge dimming mode and the bleeding circuit 102 is kept enabled.

At step S507, detect whether a predetermined time (for example, 32 bus cycles) from the LED driving apparatus being powered on is reached. If yes, the process goes to step S508, else, the process goes back to step S503.

At step S508, the LED driving apparatus enters into the no dimming mode and the bleeding circuit 102 is disabled.

Figure 6:
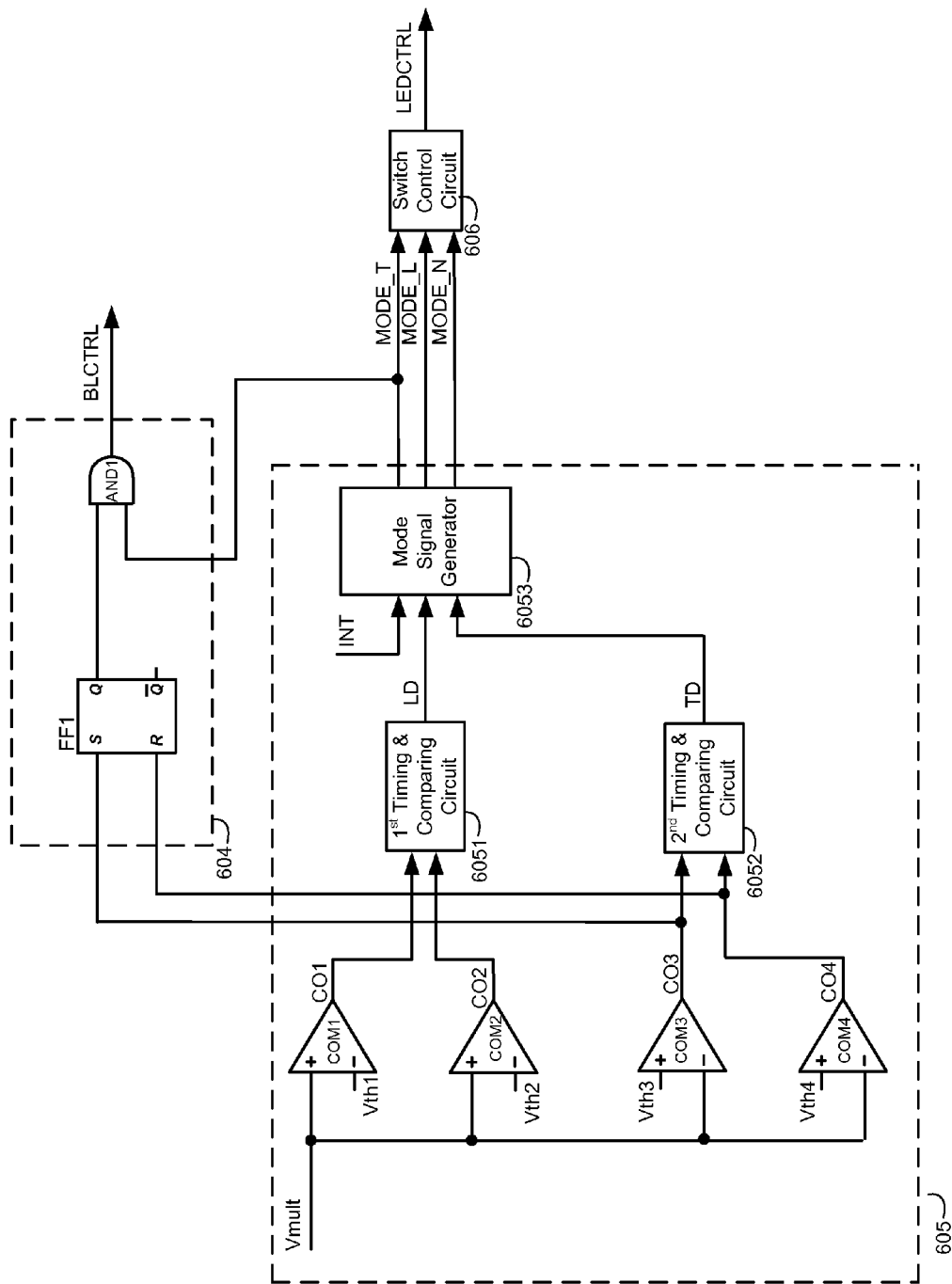
FIG. 6 schematically illustrates a controller used in an LED driving apparatus in accordance with an embodiment of the present invention.

FIG. 6 schematically illustrates a controller used in an LED driving apparatus in accordance with an embodiment of the present invention. The dimming mode detector 605 comprises comparators COM1-COM4, a first timing and comparing circuit 6051, a second timing and comparing circuit 6052 and a mode signal generator 6053. The first comparator COM1 has a first input terminal, a second input terminal and an output terminal, wherein the first input terminal is coupled to the voltage sensing circuit to receive the voltage sensing signal Vmult, the second input terminal is configured to receive the first threshold voltage Vth1, and wherein the first comparator COM1 compares the voltage sensing signal Vmult with the first threshold voltage Vth1 and generates a first comparison signal CO1 at the output terminal. The second comparator COM2 has a first input terminal, a second input terminal and an output terminal, wherein the first input terminal is coupled to the voltage sensing circuit to receive the voltage sensing signal Vmult, the second input terminal is configured to receive the second threshold voltage Vth2, and wherein the second comparator COM2 compares the voltage sensing signal Vmult with the second threshold voltage Vth2 and generates a second comparison signal CO2 at the output terminal.

The first timing and comparing circuit 6051 has a first input terminal, a second input terminal and an output terminal, wherein the first input terminal is coupled to the output terminal of the first comparator COM1, the second input terminal is coupled to the output terminal of the second comparator COM2, and wherein based on the first and second comparison signals CO1 and CO2, the first timing and comparing circuit 6051 calculates the rising time tr of the voltage sensing signal Vmult, compares the rising time tr with the first time threshold TTH1 and generates a leading edge detection signal LD at the output terminal.

The third comparator COM3 has a first input terminal, a second input terminal and an output terminal, wherein the first input terminal is configured to receive the third threshold voltage Vth3, the second input terminal is coupled to the voltage sensing circuit to receive the voltage sensing signal Vmult, and wherein the third comparator COM3 compares the voltage sensing signal Vmult with the third threshold voltage Vth3 and generates a third comparison signal CO3 at the output terminal. The fourth comparator COM4 has a first input terminal, a second input terminal and an output terminal, wherein the first input terminal is configured to receive the fourth threshold voltage Vth4, the second input terminal is coupled to the voltage sensing circuit to receive the voltage sensing signal Vmult, and wherein the fourth comparator COM4 compares the voltage sensing signal Vmult with the fourth threshold voltage Vth4 and generates a fourth comparison signal CO4 at the output terminal.

The second timing and comparing circuit 6052 has a first input terminal, a second input terminal and an output terminal, wherein the first input terminal is coupled to the output terminal of the third comparator COM3, the second input terminal is coupled to the output terminal of the fourth comparator COM4, and wherein based on the third and fourth comparison signals CO3 and Co4, the second timing and comparing circuit 6052 calculates the falling time tf of the voltage sensing signal Vmult, compares the falling time tf with the second time threshold TTH2 and generates a trailing edge detection signal TD at the output terminal.

The mode signal generator 6053 has a first input terminal, a second input terminal, a third input terminal, a first output terminal, a second output terminal and a third output terminal, wherein the first input terminal is configured to receive a power on signal INT indicative of the power on the LED driving apparatus, the second input terminal is coupled to the output terminal of the first timing and comparing circuit 6051, the third input terminal is coupled to the output terminal of the second timing and comparing circuit 6052, and wherein based on the power on signal INT, leading edge detection signal LD and trailing edge detection signal TD, the mode signal generator generates the trailing edge dimming mode signal MODE_T, leading edge dimming mode signal MODE_L and no dimming mode signal MODE_N respectively at the three output terminals.

The bleeding control circuit 604 has a first input terminal, a second input terminal, a third input terminal and an output terminal, wherein the first input terminal is coupled to the output terminal of the third comparator COM3, the second input terminal is coupled to the output terminal of the fourth comparator COM4, the third input terminal is coupled to the first output terminal of the mode signal generator 6053, and wherein based on the third comparison signal CO3, fourth comparison signal CO4 and the trailing edge dimming mode signal MODE_T, the bleeding control circuit generates the bleeding control signal BLCTRL at the output terminal. In reference to the embodiment shown in FIG. 6, the bleeding control circuit 604 includes a flip-flop FF1 and an AND gate AND1, connected as shown in the figure.

The switch control circuit 606 is coupled the mode signal generator 6052 and generates the switch control signal LED-CRTL based on the dimming mode signals MODE_T, MODE_L and MODE_N.

Figure 7:
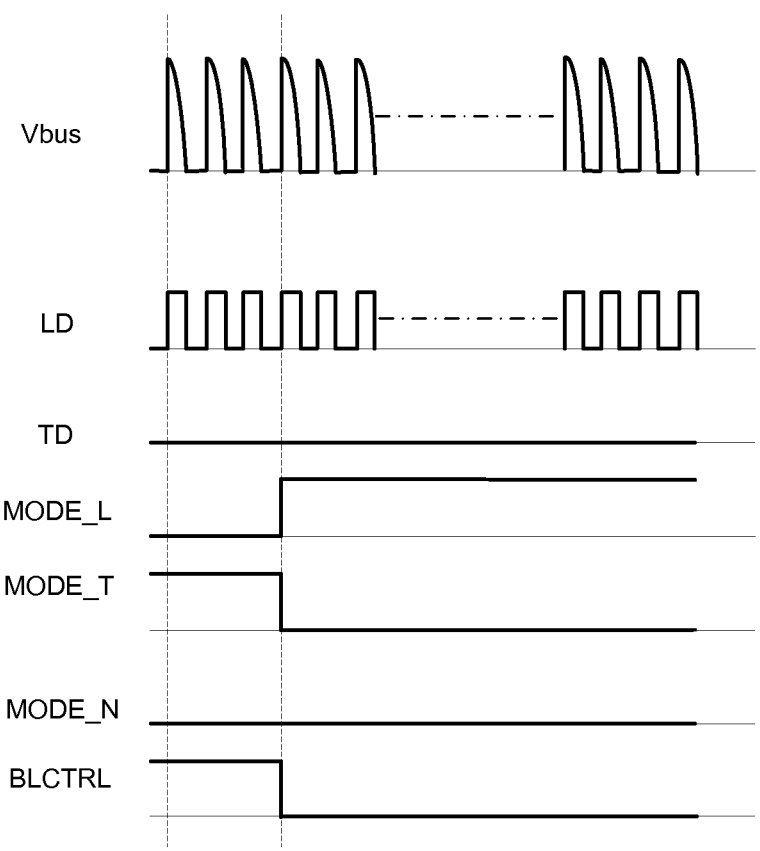
FIG. 7 schematically illustrates working waveforms of the controller shown in FIG. 6 when the LED driving apparatus is connected to a leading edge dimmer.

FIG. 7 schematically illustrates working waveforms of the controller shown in FIG. 6 when the LED driving apparatus is connected to a leading edge dimmer. It is clear from FIG. 7 that when the LED driving apparatus is just powered on, the trailing edge dimming mode signal MODE_T is logical high because of the power on signal INT. The leading edge dimming signal MODE_L and the no dimming mode signal MODE_N are both logical low. The LED driving apparatus works in the trailing edge dimming mode. When the mode signal generator 6053 detects that the rising time tr of the voltage sensing signal Vmult is shorter than the first time threshold TTH1 in four successive switching cycles, the leading edge dimming mode signal MODE_L becomes logical high, the trailing edge dimming mode signal MODE_T and the no dimming mode signal MODE_N become logical low. The LED driving apparatus enters into the leading edge dimming mode.

Figure 8:
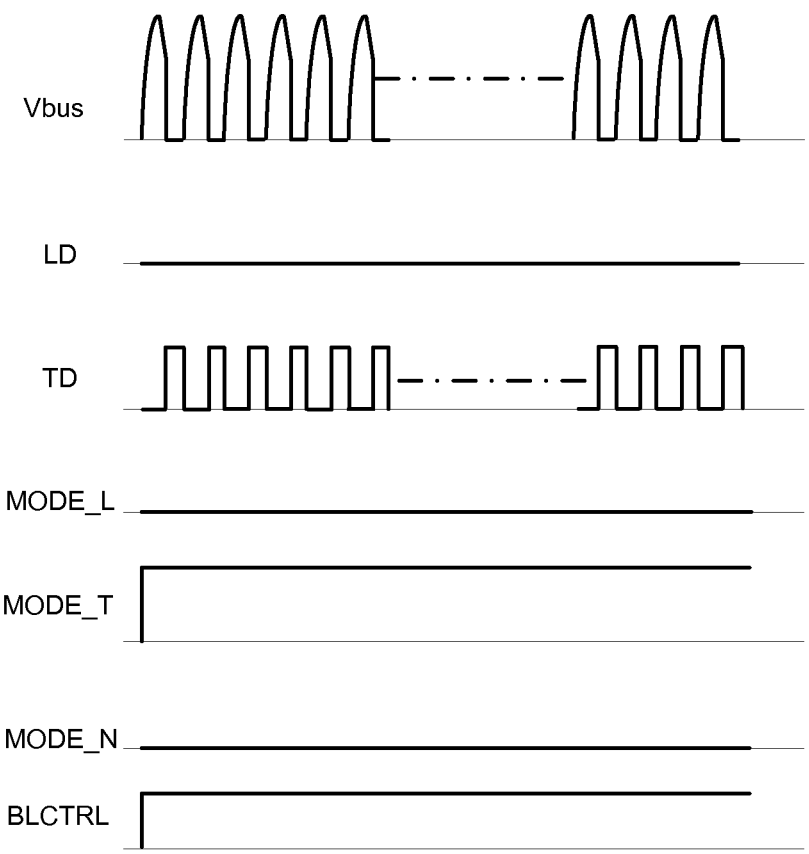
FIG. 8 schematically illustrates working waveforms of the controller shown in FIG. 6 when the LED driving apparatus is connected to a trailing edge dimmer.

FIG. 8 schematically illustrates working waveforms of the controller shown in FIG. 6 when the LED driving apparatus is connected to a trailing edge dimmer. As shown in FIG. 8, when the LED driving apparatus is just powered on, the trailing edge dimming mode signal MODE_T is logical high because of the power on signal INT. The leading edge dimming signal MODE_L and the no dimming mode signal MODE_N are both logical low. The LED driving apparatus works in the trailing edge dimming mode. Since the falling time tf of the voltage sensing signal Vmult is shorter than the second time threshold TTH2, the trailing edge dimming mode signal MODE_T maintains high because of the trailing edge detection signal TD. The leading edge dimming mode signal MODE_L and the no dimming mode signal MODE_N keep low. The LED driving apparatus remains in the trailing edge dimming mode.

Figure 9:
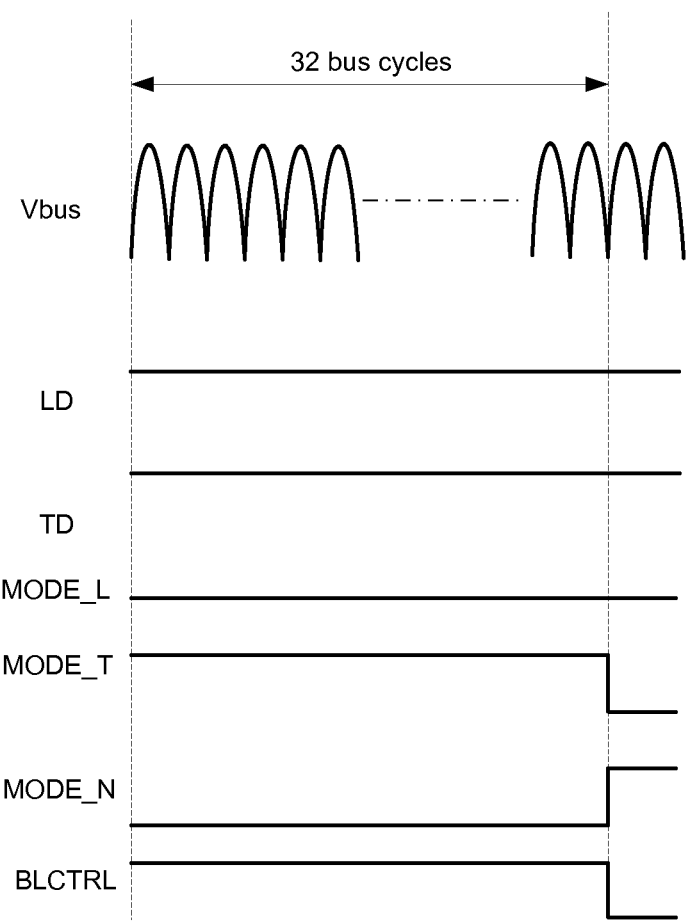
FIG. 9 schematically illustrates working waveforms of the controller shown in FIG. 6 when the LED driving apparatus is not connected to any dimmer.

FIG. 9 schematically illustrates working waveforms of the controller shown in FIG. 6 when the LED driving apparatus is not connected to any dimmer. As can be seen from FIG. 9, when the LED driving apparatus is just powered on, the trailing edge dimming mode signal MODE_T is logical high because of the power on signal INT. The leading edge dimming signal MODE_L and the no dimming mode signal MODE_N are both logical low. The LED driving apparatus works in the trailing edge dimming mode. Since neither a leading edge dimmer nor a trailing edge dimmer has been detected in 32 bus cycles from power on, the no dimming mode signal MODE_N becomes logical high, the leading edge dimming mode signal MODE_L and the trailing edge dimming mode signal MODE_T change to logical low. The LED driving apparatus enters in the no dimming mode.

Figure 10:
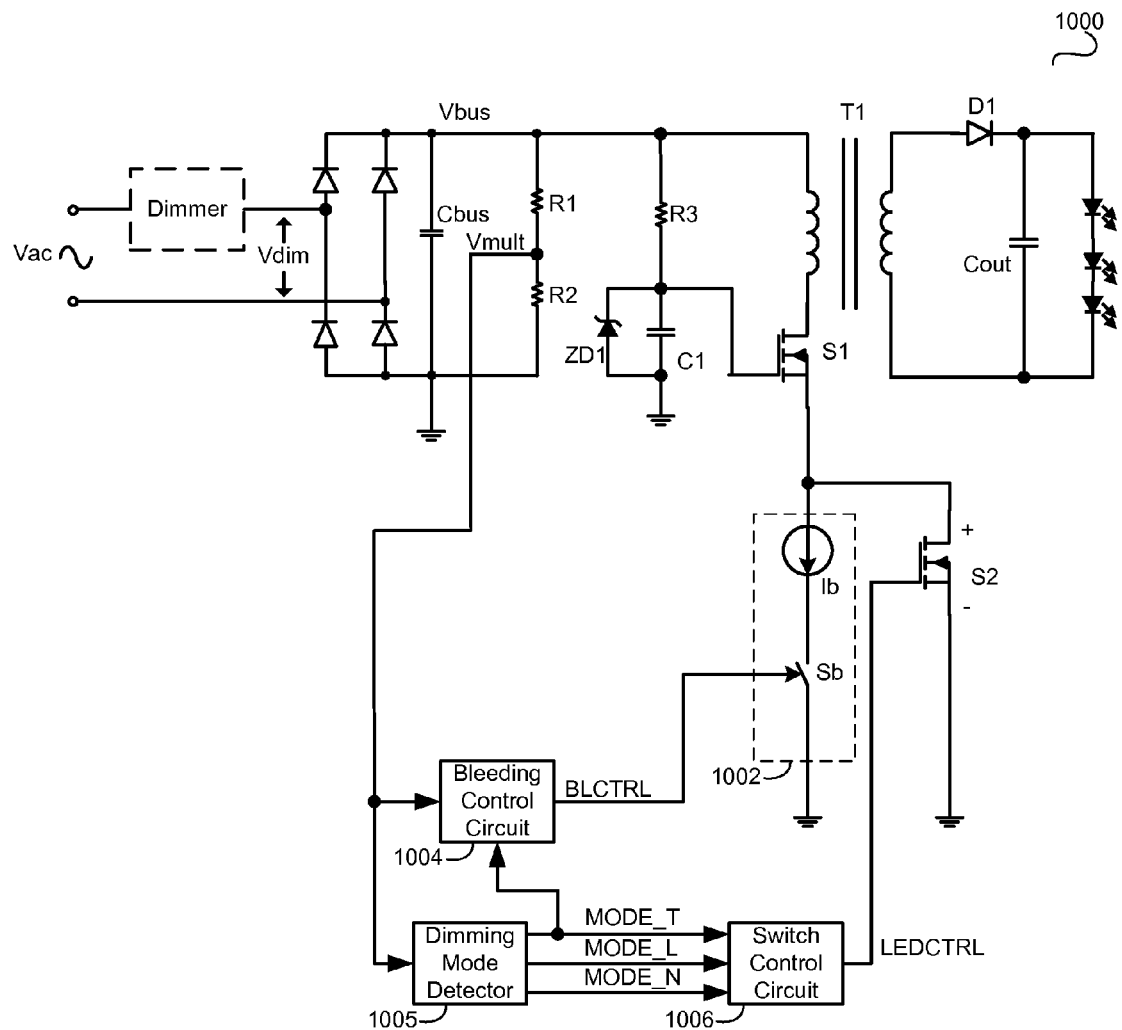
FIG. 10 schematically illustrates a block diagram of an LED driving apparatus 1000 in accordance with an embodiment of the present invention.

FIG. 10 schematically illustrates a block diagram of an LED driving apparatus 1000 in accordance with an embodiment of the present invention. The switching converter in the LED driving apparatus 1000 is configured in a flyback topology including a transformer t1, transistors S1, S2, a diode D1 and an output capacitor Cout. The transformer T1 has a primary winding and a secondary winding, wherein the primary winding and secondary winding both have a first terminal and a second terminal. The first terminal of the primary winding is coupled to the output terminal of the rectifier bridge to receive the DC bus voltage Vbus. The first transistor S1 has a first terminal, a second terminal and a control terminal, wherein the first terminal is coupled to the second terminal of the primary winding. The second transistor S2 has a first terminal, a second terminal and a control terminal, wherein the first terminal is coupled to the second terminal of the first transistor S1, the second terminal is coupled to the reference ground, the control terminal is coupled to the switch control circuit 1006 to receive the switch control signal LEDCTRL.

The diode D1 has an anode and a cathode, wherein the anode is coupled to a first terminal of the secondary winding. The output capacitor Cout is coupled between the cathode of the diode D1 and the second terminal of the secondary winding. Although the diode D1 is used for free-wheeling in the embodiment of FIG. 10, people of ordinary skill in the art can recognize that the diode D1 may also be replaced by other suitable free-wheeling switch, such as MOSFET.

The bleeding circuit 1002 comprises a bleeding current source Ib and a bleeding transistor Sb. The bleeding current source Ib has a first terminal and a second terminal, wherein the first terminal is coupled to the second terminal of the first transistor S1 and the first terminal of the second transistor S2. The bleeding transistor Sb has a first terminal, a second terminal and an output terminal, wherein the first terminal is coupled to the second terminal of the bleeding current source Ib, the second terminal is coupled to the reference ground, and the control terminal is coupled to the bleeding control circuit 1004 to receive the bleeding control signal BLCTRL.

In some embodiments, the switching converter shown in FIG. 10 further comprises a resistor R3, a capacitor C1 and a zener diode ZD1 connected as shown in the figure.

The bleeding transistor Sb and the second transistor S2 are coupled between the first transistor S1 and the reference ground, thus do not need to sustain high voltage. This allows IC manufacturers to fabricate the bleeding circuit 1002, bleeding control circuit 1004, dimming mode detector 1005, switch control circuit 1006 and the second transistor S2 on a single chip.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A dimming mode detection method used in an LED driving apparatus, wherein the LED driving apparatus includes a rectifier bridge providing a DC bus voltage, a bus capacitor coupled between output terminals of the rectifier bridge, a bleeding circuit configured to provide a bleeding current for the bus capacitor and a switching converter configured to convert the DC bus voltage into a driving signal to drive an LED, and wherein the dimming mode detection method comprises:
   powering on the LED driving apparatus;
   sensing the DC bus voltage and generating a voltage sensing signal;
   comparing a rising time during which the voltage sensing signal increases from a second threshold voltage to a first threshold voltage with a first time threshold to detect whether the LED driving apparatus is connected to a leading edge dimmer, and entering into a leading edge dimming mode if the LED driving apparatus is detected to be connected to a leading edge dimmer;
   comparing a falling time during which the voltage sensing signal decreases from a third threshold voltage to a fourth threshold voltage with a second time threshold to detect whether the LED driving apparatus is connected to a trailing edge dimmer, and entering into a trailing edge dimming mode if the LED driving apparatus is detected to be connected to a trailing edge dimmer; and
   entering into a no dimming mode if the LED driving apparatus does not enter the leading edge dimming mode or the trailing edge dimming mode in a predetermined time from the LED driving apparatus being powered on.

2. The dimming mode detection method of claim 1, wherein the LED driving apparatus enters into the leading edge dimming mode if the rising time is shorter than the first time threshold.

3. The dimming mode detection method of claim 1, wherein the LED driving apparatus enters into the leading edge dimming mode if the rising time is shorter than the first time threshold in a plurality of successive bus cycles.

4. The dimming mode detection method of claim 1, wherein the LED driving apparatus enters into the trailing edge dimming mode if the falling time is shorter than the second time threshold.

5. The dimming mode detection method of claim 1, wherein the bleeding circuit is enabled in the trailing edge dimming mode, and disabled in the leading edge dimming mode and no dimming mode.

6. The dimming mode detection method of claim 1, wherein when the voltage sensing signal reduces to reach the third threshold voltage, the bleeding circuit provides the bleeding current for the bus capacitor until the voltage sensing signal reaches the fourth threshold voltage.

7. A controller used in an LED driving apparatus, wherein the LED driving apparatus includes a rectifier bridge providing a DC bus voltage, a bus capacitor coupled between output terminals of the rectifier bridge, a bleeding circuit configured to provide a bleeding current for the bus capacitor and a switching converter configured to convert the DC bus voltage into a driving signal to drive an LED, and wherein the controller comprises:
   a dimming mode detector configured to receive a voltage sensing signal indicative of the DC bus voltage, wherein the dimming mode detector compares a rising time during which the voltage sensing signal increases from a second threshold voltage to a first threshold voltage with a first time threshold to detect whether the LED driving apparatus is connected to a leading edge dimmer, and compares a falling time during which the voltage sensing signal decreases from a third threshold voltage to a fourth threshold voltage with a second time threshold to detect whether the LED driving apparatus is connected to a trailing edge dimmer, and wherein based on the comparison results, the dimming mode detector generates a leading edge dimming mode signal, a trailing edge dimming mode signal and a no dimming mode signal to indicate operation modes of the LED driving apparatus;

a bleeding control circuit configured to receive the voltage sensing signal, wherein based on the voltage sensing signal, the bleeding control circuit generates a bleeding control signal to control the bleeding circuit; and a switch control circuit coupled to the dimming mode detector, wherein based on the leading edge dimming mode signal, trailing edge dimming mode signal and no dimming mode signal, the switch control circuit generates a switch control signal to control the switching converter.

8. The controller of claim 7, wherein if the LED driving apparatus is not detected to be connected to either a leading edge dimmer or a trailing edge dimmer in a predetermined time from the LED driving apparatus being powered on, the LED driving apparatus will be deemed as not being connected to any dimmer.

9. The controller of claim 7, wherein the bleeding control circuit is coupled to the dimming mode detector, and wherein based on the trailing edge dimming mode signal, the bleeding control circuit enables the bleeding circuit in the trailing edge dimming mode, and disabled the bleeding circuit in the leading edge dimming mode and no dimming mode.

10. The controller of claim 7, wherein when the voltage sensing signal reduces to reach the third threshold voltage, the bleeding circuit provides the bleeding current for the bus capacitor until the voltage sensing signal reaches the fourth threshold voltage.

11. The controller of claim 7, wherein the dimming mode detector comprises:

a first comparator having a first input terminal, a second input terminal and an output terminal, wherein the first input terminal is configured to receive the voltage sensing signal, the second input terminal is configured to receive the first threshold voltage, and wherein the first comparator compares the voltage sensing signal with the first threshold voltage and generates a first comparison signal at the output terminal;

a second comparator having a first input terminal, a second input terminal and an output terminal, wherein the first input terminal is configured to receive the voltage sensing signal, the second input terminal is configured to receive the second threshold voltage, and wherein the second comparator compares the voltage sensing signal with the second threshold voltage and generates a second comparison signal at the output terminal;

a first timing and comparing circuit having a first input terminal, a second input terminal and an output terminal, wherein the first input terminal is coupled to the output terminal of the first comparator, the second input terminal is coupled to the output terminal of the second comparator, and wherein based on the first and second comparison signals, the first timing and comparing circuit calculates the rising time of the voltage sensing signal, compares the rising time with the first time threshold and generates a leading edge detection signal at the output terminal;

a third comparator having a first input terminal, a second input terminal and an output terminal, wherein the first input terminal is configured to receive the third threshold voltage, the second input terminal is configured to receive the voltage sensing signal, and wherein the third comparator compares the voltage sensing signal with the third threshold voltage and generates a third comparison signal at the output terminal;

a fourth comparator having a first input terminal, a second input terminal and an output terminal, wherein the first input terminal is configured to receive the fourth threshold voltage, the second input terminal is configured to receive the voltage sensing signal, and wherein the fourth comparator compares the voltage sensing signal with the fourth threshold voltage and generates a fourth comparison signal at the output terminal;

a second timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the second timing and comparing circuit calculates the falling time of the voltage sensing signal, compares the falling time with the second time threshold and generates a trailing edge detection signal at the output terminal; and a mode signal generator having a first input terminal, a second input terminal, a third input terminal, a first output terminal, a second output terminal and a third output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal, leading edge dimming mode signal and no dimming mode signal respectively at the first, second and third output terminals.

12. The controller of claim 11, wherein the bleeding control circuit has a first input terminal, a second input terminal, a third input terminal and an output terminal, wherein the first input terminal is coupled to the output terminal of the third comparator, the second input terminal is coupled to the output terminal of the fourth comparator, the third input terminal is coupled to the first output terminal of the mode signal generator, and wherein based on the third comparison signal, fourth comparison signal and the trailing edge dimming mode signal, the bleeding control circuit generates the bleeding control signal at the output terminal.

13. An LED driving apparatus comprising:

a rectifier bridge having an output terminal, wherein the rectifier bridge is configured to generate a DC bus voltage at the output terminal;

a bus capacitor coupled between the output terminal of the rectifier bridge and a reference ground;

a voltage sensing circuit coupled to the output terminal of the rectifier bridge, wherein the voltage sensing circuit generates a voltage sensing signal indicative of the DC bus voltage;

a bleeding circuit configured to provide a bleeding current for the bus capacitor;

a switching converter coupled to the output terminal of the rectifier bridge, wherein the switching converter is configured to convert the DC bus voltage into a driving signal to drive an LED;

a dimming mode detector coupled to the voltage sensing circuit to receive the voltage sensing signal, wherein the dimming mode detector compares a rising time during which the voltage sensing signal increases from a second threshold voltage to a first threshold voltage with a first time threshold to detect whether the LED driving apparatus is connected to a leading edge dimmer, and compares a falling time during which the voltage sensing signal decreases from a third threshold voltage to a fourth threshold voltage with a second time threshold to detect whether the LED driving apparatus is connected to a trailing edge dimmer, and wherein based on the comparison results, the dimming mode detector generates a leading edge dimming mode signal, a trailing edge dimming mode signal and a no dimming mode signal to indicate operation modes of the LED driving apparatus;

a bleeding control circuit coupled to the voltage sensing circuit to receive the voltage sensing signal, wherein based on the voltage sensing signal, the bleeding control circuit generates a bleeding control signal to control the bleeding circuit; and a switch control circuit coupled to the dimming mode detector, wherein based on the leading edge dimming mode signal, trailing edge dimming mode signal and no dimming mode signal, the switch control circuit generates a switch control signal to control the switching converter.

14. The LED driving apparatus of claim 13, wherein if the LED driving apparatus is not detected to be connected to either a leading edge dimmer or a trailing edge dimmer in a predetermined time from the LED driving apparatus being powered on, the LED driving apparatus will be deemed as not being connected to any dimmer.

15. The LED driving apparatus of claim 13, wherein the bleeding control circuit is further coupled to the dimming mode detector, and wherein the bleeding control circuit enables the bleeding circuit in the trailing edge dimming mode, and disabled the bleeding circuit in the leading edge dimming mode and no dimming mode.

16. The LED driving apparatus of claim 13, wherein when the voltage sensing signal reduces to reach the third threshold voltage, the bleeding circuit provides the bleeding current for the bus capacitor until the voltage sensing signal reaches the fourth threshold voltage.

17. The LED driving apparatus of claim 13, wherein the dimming mode detector comprises:

a first comparator having a first input terminal, a second input terminal and an output terminal, wherein the first input terminal is coupled to the voltage sensing circuit to receive the voltage sensing signal, the second input terminal is configured to receive the first threshold voltage, and wherein the first comparator compares the voltage sensing signal with the first threshold voltage and generates a first comparison signal at the output terminal;

a second comparator having a first input terminal, a second input terminal and an output terminal, wherein the first input terminal is coupled to the voltage sensing circuit to receive the voltage sensing signal, the second input terminal is configured to receive the second threshold voltage, and wherein the second comparator compares the voltage sensing signal with the second threshold voltage and generates a second comparison signal at the output terminal;

a first timing and comparing circuit having a first input terminal, a second input terminal and an output terminal, wherein the first input terminal is coupled to the output terminal of the first comparator, the second input terminal is coupled to the output terminal of the second comparator, and wherein based on the first and second comparison signals, the first timing and comparing circuit calculates the rising time of the voltage sensing signal, compares the rising time with the first time threshold and generates a leading edge detection signal at the output terminal;

a third comparator having a first input terminal, a second input terminal and an output terminal, wherein the first input terminal is configured to receive the third threshold voltage, the second input terminal is coupled to the voltage sensing circuit to receive the voltage sensing signal, and wherein the third comparator compares the voltage sensing signal with the third threshold voltage and generates a third comparison signal at the output terminal;

a fourth comparator having a first input terminal, a second input terminal and an output terminal, wherein the first input terminal is configured to receive the fourth threshold voltage, the second input terminal is coupled to the voltage sensing circuit to receive the voltage sensing signal, and wherein the fourth comparator compares the voltage sensing signal with the fourth threshold voltage and generates a fourth comparison signal at the output terminal;

a second timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the second timing and comparing circuit calculates the falling time of the voltage sensing signal, compares the falling time with the second time threshold and generates a trailing edge detection signal at the output terminal; and a mode signal generator having a first input terminal, a second input terminal, a third input terminal, a first output terminal, a second output terminal and a third output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal, leading edge dimming mode signal and no dimming mode signal respectively at the first, second and third output terminals.

18. The LED driving apparatus of claim 17, wherein the bleeding control circuit has a first input terminal, a second input terminal, a third input terminal and an output terminal, wherein the first input terminal is coupled to the output terminal of the third comparator, the second input terminal is coupled to the output terminal of the fourth comparator, the third input terminal is coupled to the first output terminal of the mode signal generator, and wherein based on the third comparison signal, fourth comparison signal and the trailing edge dimming mode signal, the bleeding control circuit generates the bleeding control signal at the output terminal.

19. The LED driving apparatus of claim 13, wherein the switching converter comprises:

a transformer having a primary winding and a secondary winding, wherein the primary winding and secondary winding both have a first terminal and a second terminal, and the first terminal of the primary winding is coupled to the output terminal of the rectifier bridge to receive the DC bus voltage;

a first transistor having a first terminal, a second terminal and a control terminal, wherein the first terminal is coupled to the second terminal of the primary winding;

a second transistor having a first terminal, a second terminal and a control terminal, wherein the first terminal is coupled to the second terminal of the first transistor, the second terminal is coupled to the reference ground, the control terminal is coupled to the switch control circuit to receive the switch control signal;

a free-wheeling switch having a first terminal and a second terminal, wherein the first terminal is coupled to the first terminal of the secondary winding; and an output capacitor coupled between the second terminal of the free-wheeling switch and the second terminal of the secondary winding.

20. The LED driving apparatus of claim 19, wherein the bleeding circuit comprises:

a bleeding current source having a first terminal and a second terminal, wherein the first terminal is coupled to the second terminal of the first transistor and the first terminal of the second transistor; and a bleeding transistor having a first terminal, a second terminal and an output terminal, wherein the first terminal is coupled to the second terminal of the bleeding current source, the second terminal is coupled to the reference ground, and the control terminal is coupled to the bleeding control circuit to receive the bleeding control signal.

* * * * *